Feb. 5, 1952 G. C. HOLLAND 2,584,350
FRUIT BASKET
Filed Sept. 20, 1948

Inventor
GEO. CURTIS HOLLAND

By David E. Varner
Attorney

Patented Feb. 5, 1952

2,584,350

UNITED STATES PATENT OFFICE 2,584,350

FRUIT BASKET

George C. Holland, Hollins, Va.

Application September 20, 1948, Serial No. 50,165

2 Claims. (Cl. 217—125)

This invention relates to a basket and more particularly to a container or basket in which fruit may be packed by a grower, stored, shipped, and retailed directly to a consumer. The basket is specifically designed as a container for apples and is described with reference thereto, but it will be understood that the basket may be used for other fruit, as well, such as pears, peaches, oranges, etc.

Apples commonly are packed by growers, stored, and shipped to market in large containers, usually tub-shaped bushel baskets, barrels, or box-type crates. The apples remain in such containers during purchase by wholesalers and distribution to retailers. The apples may then be dumped into a bin for purchase in pound lots by the consumer, or the latter may buy direct from the packing and shipping container.

There are numerous disadvantages to such large containers. Packaging in large bulk results in bruised fruit, since the lower layers of fruit must support the entire weight of numerous overlying layers. Large bulk containers also necessitate rehandling the fruit for a retail sale to a consumer, thus affording an opportunity for further bruising of the fruit as well as consuming time during a counting or weighing process. In the case of tube-shaped bushel baskets and barrels, storage and shipping space is not utilized to the maximum because of the round shape of the containers. Bushel baskets containers also usually have a bulging cover caused by the necessity of obtaining a tight "pack." Loose fruit resulting from a slack pack will roll around in the container when in transit and become badly bruised. A tight pack usually can be effected in conventional bushel baskets, however, only by packing the basket overfull in the center and then forcing the rim of the cover down into fastening engagement with the rim of the container. The result is a bulging cover. A bulging cover, when filled containers are stacked, in addition to wasting storage or shipping space, causes the weight of overlying containers of the stack to be carried by the contents of the lower containers and not by the container walls. The result is intensive bruising of the fruit in the container. Crate or box-type large bulk containers for fruit also possess the above described objectionable "bulge" on the sides as well as the top.

Accordingly, it is an object of this invention to provide a consumer size container for packing, storing, shipping, and retailing fruit.

It is another object of this invention to provide a fruit container that makes substantially maximum utilization of storage and shipping space.

It is still another object of this invention to provide a fruit container that protects the contents thereof against damage from external forces.

It is a further object of this invention to provide an inexpensive fruit container which may be sold together with its contents directly to a consumer.

Still another object of this invention is to provide a fruit container with convenient handle-like carrying means, that may be disposed in a non-interfering position while the basket is being packed, stored, and/or shipped, and yet readily may be placed in carrying position when needed.

Another object of this invention is to provide an inexpensive fruit container of simple yet sturdy construction.

Other objects and advantages of the invention will be evident from the following description and accompanying drawings, in which.

Figure 1:
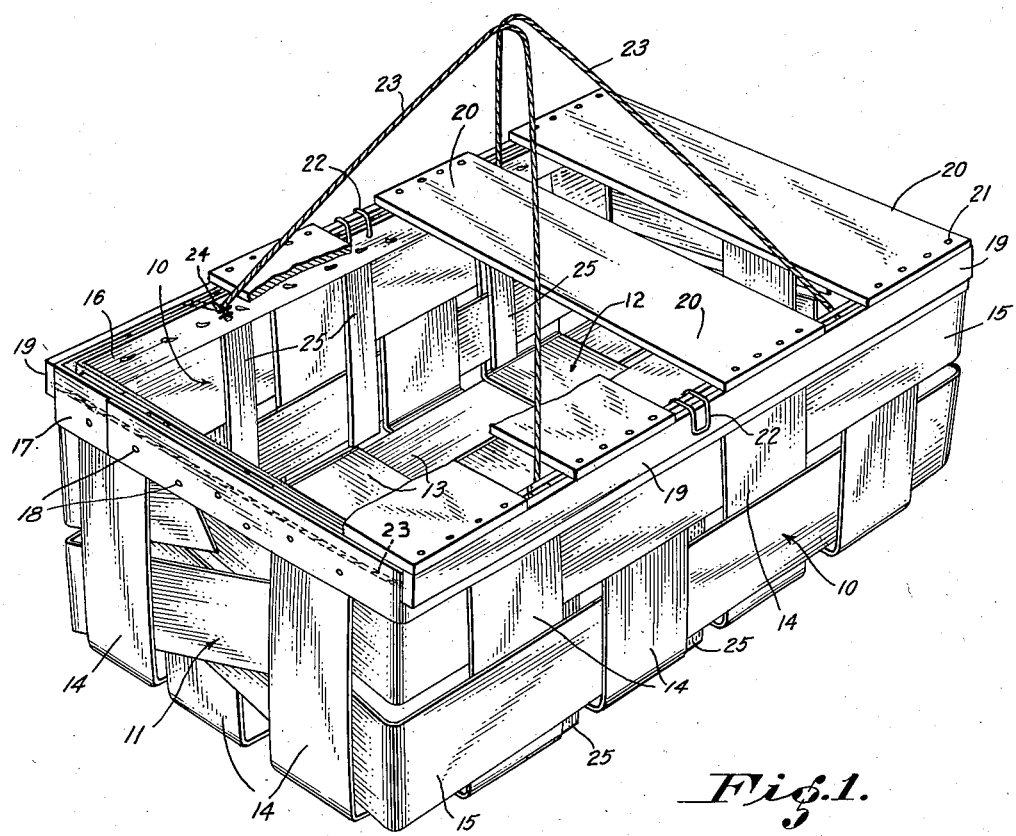
Figure 1 is a perspective view of a container embodying this invention, with the cover in place and the carrying means in operative position. A portion of the cover is broken away to show details more clearly.

Referring to Figure 1 of the drawings, a container embodying this invention is illustrated by a generally rectangular basket having substantially flat upwardly diverging side and end walls, 10 and 11 respectively, and a substantially flat bottom 12. The bottom 12 of the basket is formed by two interwoven sets of spaced parallel splints 13, disposed at right angles to each other. These splints 13 preferably consist of thin strips of wood. Integral end extensions 14 of the bottom splints 13 are scored and bent into an upstanding position to form a part of the side and end walls. Other spaced splints 15 are interwoven with the upstanding end extensions 14 to complete the side and end walls 10 and 11, respectively. The rim of the basket is reinforced by hoop-like inner and outer wooden strips 16 and 17, respectively, which are secured to the upper edges of the side and end walls by nails 18, as shown, staples, or other suitable fastening means. The strips 16 and 17 not only reinforce the basket rim, but also serve to secure the integral end extensions 14 of the bottom splints 13 in upstanding position and thus maintain the shape of the basket.

The basket is intended to be constructed in different sizes, each of which is designed to contain a relatively small number, such as two dozen, high quality apples of substantially the same size, i. e. a standard size, although small variations in size of the fruit intended for any one basket size are acceptable. All the different size baskets are designed so that they may be filled level full with always the same number of apples of the size corresponding thereto. This same number may always be packed, in no more than two or three layers, tightly in the basket, for reasons later described. A package with these characteristics eliminates, to some extent, the necessity for hand sizing, since fruit larger or smaller than that size for which a particular size basket is designed cannot be packed tightly and only level full in the basket. It also will be seen that since the bottom layer of fruit supports the weight of no more than two overlying layers, bruising of the lower layers of fruit is largely eliminated. It also is pointed out that the upwardly diverging side and end walls 10 and 11 of the container permit a plurality of empty baskets to be nested and the covers therefor (later described) to be stacked separately, thus saving shipping and storage space before the containers are filled.

The basket is provided with a closure or cover consisting of depending side rails 19 having spaced transverse slats 20 secured to the upper edges thereof by nails, as shown, staples, or any other suitable fastening means. The lateral spacing between the rails 19 is such that when the cover is in place the slats 20 rest directly on the reinforced rim of the basket with the rails snugly engaging over the upper edges of the longitudinal side walls 10. Hence, if the mouth of the lightly constructed basket has spread somewhat during packing of fruit therein, the cover rails 19 serve to pull the rather flexible side walls 10 of the basket back into place and so pack the fruit tightly and level full therein. The cover rails 19 also serve to maintain the shape of the basket when filled with fruit and stacked one upon another.

The cover slats 20 are uniformly spaced to provide at least three transverse slots in the cover. One slot is located substantially centrally of the cover with the remaining two slots spaced uniformly on either side thereof. Deformable wire fasteners 22 are secured to the reinforced rim of the basket at substantially the mid point of the side walls 10. These fasteners 22 are adapted to extend upwardly through the central slot in the cover and then are bent outwardly and downwardly over the cover side rails 19, as shown, to secure the cover in place.

Figure 2:
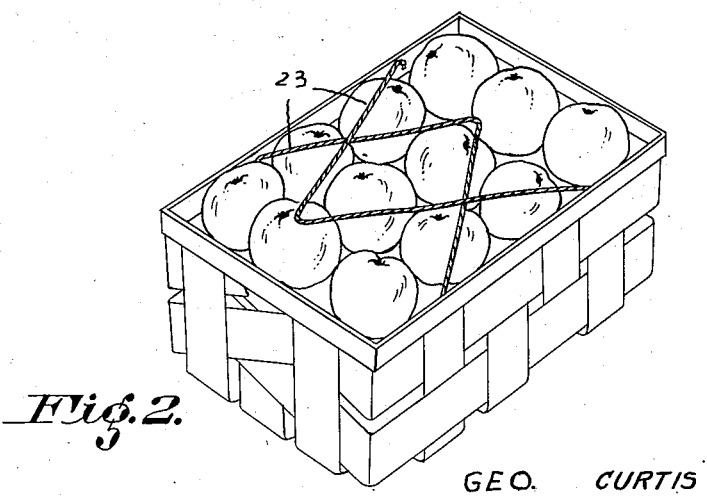
Figure 2 is a diagrammatic perspective view of a container with the cover removed and filled with apples, showing the preferred position of the carrying means during shipment and storage.

The basket also is provided with handle-like means, for carrying purposes, comprising two cord-like flexible members 23 formed of wire, bostring, plastic, or other suitable material. The ends of each member are secured to the opposite side walls 10, as shown, at longitudinal locations adjacent the two end slots in the cover. Staples 24 or other suitable means fasten the ends of each member 23 to the inner (as shown) or outer side of the rim of the basket. The length of the members 23 is such that, when the basket cover is removed, the intermediate portions thereof may be disposed in positions extending closely around the ends of the basket, as illustrated by dotted lines in Figure 1, and frictionally maintained in such position. During the packing process, the members 23 preferably are placed in this position in order to be out of the way. After the basket is filled with fruit, the members are removed from around the ends of the basket and disposed on top of the fruit, preferably in a position such as shown diagrammatically in Figure 2. The cover may then be placed in position and fastened in place.

When the flexible members 23 are to be used as handles to carry a filled and covered basket, the intermediate portions thereof are easily reached on top of the fruit through the two end slots in the cover and drawn out therethrough into the position illustrated in Figure 1. It will be seen that in this position the intermediate portions of both members 23 serve as bails that easily may be grasped in one hand to carry the basket. It is pointed out that although the flexible members are completely out of the way during packing, storage, or shipment, they are conveniently available for use at any time even with the cover in place.

The invention also contemplates simple and inexpensive means for reinforcing the basket against collapsing forces imposed by vertical loads thereon. Such loads are commonly caused by stacking filled baskets during storage and/or shipment. It readily will be seen that the light weight upstanding splint extensions 14 forming a part of the side and end walls 10 and 11 are not strong enough to resist crushing stresses imposed on the basket by vertical loads. Accordingly, if reinforcing means are not provided, the walls 10 and 11 may collapse under such vertical loads and cause the load to be borne by the fruit in the basket, thereby bruising the fruit. To eliminate this undesirable result, narrow, flat elongated reinforcing members or struts 25 are used. These struts 25 may be formed of wood or other suitable material sufficiently strong enough to bear any normal vertical loads imposed on the basket. The struts are of the same height as the side walls of the basket and have their upper ends secured to the reinforced rim thereof, preferably between the inner and outer strips 16 and 17, by nails, staples, or other suitable fastening means. The struts 25 extend downward from the rim into the basket, preferably flush against the side walls 10, with the lower ends engaging the bottom 12 of the basket. Six such struts 25, three along each side wall 10, have been found sufficient to reinforce the basket against normal vertical loads. The struts preferably are spaced longitudinally along the side walls at positions located between those occupied by adjacent apples, when the latter are packed in the basket, so that the edges of the struts will be out of contact with the packed apples to avoid damage thereto.

It is to be understood that any vertical loads imposed on the basket cover will be transmitted directly to the reinforced rim, and from the rim directly to the struts 25, which engage the bottom 12 of the basket. Hence, no normal load will cause the lightly constructed side and end walls 10 and 11 to collapse and thus transfer the load to the fruit in the basket.

The central vertical strut 25 along each side wall 10 performs another function, in addition to that of preventing side wall collapse. The conventional wire fastening members 22, which are secured in place by piercing the basket rim, are quite stiff and require considerable force to bend from an original upright position down over the side rails 19 to fasten the cover in place. Similarly a large force is required to straighten these fasteners back into their original position in order to unfasten the cover for removal. The rim of the basket, though reinforced by the hoop-like strips 16 and 17, may not be strong enough to resist such bending of the fasteners 22 without giving way. The central vertical strut provides the needed additional reinforcement to the rim at the location where the fasteners are secured. The fasteners 22 accordingly pierce not only the strips 16 and 17, but also the upper end of the central vertical struts 25. Hence, when the fasteners are bent outwardly and downwardly, the central struts, the lower ends of which are held against inward movement by the packed fruit, prevent breakage of the weak side walls 10.

This invention also may be embodied in a basket having walls formed of cardboard, thin plastic material, or the like, either in sheet or strip form. Furthermore, it will be obvious that various changes in the specific basket illustrated and described may be made by one skilled in the art without departing from the principles of the invention. Accordingly, this invention embraces all modifications which come within the spirit and scope of the following claims.

I claim:

1. A rectangular open-mouthed container having upwardly diverging side and end walls of light construction; hoop means secured to the upper ends of said walls to reinforce the rim of said container; a cover for said container comprising depending side rails adapted to closely embrace the outer sides of said side walls and having transverse slats secured thereto, said slats being spaced to provide a central transverse slot in said cover and at least one transverse slot on each side of said central slot; cover fastening means comprising bendable metallic members secured to each said side wall at substantially the mid point thereof, each said member being adapted to extend upwardly through said central cover slot and be bent downwardly over the corresponding said side rail to retain said cover on said container; and handle means for carrying said container comprising a pair of pliable cord-like members, one associated with each of said cover slots on opposite sides of said central slot, having the ends thereof secured to opposite said side walls adjacent the said associated slots in said cover, the intermediate portions of said cords being adapted to extend upwardly through said associated slots and into close proximity of one another, whereby both said portions may be grasped in one hand for carrying said container.

2. A light weight inexpensive basket-like shipping container adapted to hold and protect a relatively small number of select fruit for retail sale as a unit to a customer, said container comprising: an open-mouthed substantially rectangular receptacle having substantially unitary side, end, and unreinforced bottom walls of light construction, said side and end walls being upwardly divergent to permit a plurality of said receptacles to be nested when empty; hoop means secured to the upper ends of said side and end walls for reinforcing the rim of said receptacle; a flat-topped cover for said receptacle comprising spaced transverse slats secured to depending side rails and providing a pair of transverse slots spaced at equal distances from opposite ends of said cover, said slats being adapted to rest upon the upper edge of said side walls with said side rails closely embracing the outer sides thereof; a plurality of vertical-load-supporting straight struts disposed closely adjacent and parallel to the inner sides of said side walls and substantially evenly spaced therealong, each said strut having the upper end thereof secured to said reinforced rim and the lower end thereof in contact with said bottom wall, whereby said struts prevent crushing of said lightly constructed side and end walls under vertical loads and also prevent twisting or rolling of the side wall portions of said reinforced rim by torsional forces, said receptacle and cover, when assembled, being free of protuberances above the top of said cover, whereby a plurality of filled containers can be stacked without damage to the containers or their contents; and handle means comprising a pair of pliable cord-like members, one associated with each of said slots, each said member having the opposite ends thereof secured to opposite portions of the reinforced rim of said receptacle at locations adjacent said associated cover slot, the intermediate portion of each said member being adapted to be disposed normally within said receptacle, when said cover is assembled therewith, and to be withdrawn outwardly through said associated slot for use, whereby the intermediate portions of both said members may be grasped in one hand for carrying the container.

GEORGE C. HOLLAND.

REFERENCES CITED

The following references are of record in the file of this patent:

UNITED STATES PATENTS

| Number | Name | Date |
|---|---|---|
| 31,119 | Hegarty | Jan. 15, 1861 |
| 500,991 | Carlson | July 4, 1893 |
| 669,768 | Sitterly | Mar. 12, 1901 |
| 678,985 | Sitterly | July 23, 1901 |
| 972,586 | Wahl | Oct. 11, 1910 |
| 1,294,092 | Greenlee et al. | Feb. 11, 1919 |
| 1,717,733 | Prati | June 18, 1929 |
| 1,981,187 | Nuckols | Nov. 20, 1934 |
| 2,124,217 | Benschoten | July 19, 1938 |